(12) United States Patent
Wu

(10) Patent No.: US 12,082,255 B2
(45) Date of Patent: Sep. 3, 2024

(54) RANDOM ACCESS IN A TELECOMMUNICATION NETWORK

(71) Applicant: Samsung Electronics Co., Ltd., Suwon-si (KR)

(72) Inventor: Shangbin Wu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 49 days.

(21) Appl. No.: 17/041,235

(22) PCT Filed: Mar. 26, 2019

(86) PCT No.: PCT/KR2019/003497
§ 371 (c)(1),
(2) Date: Sep. 24, 2020

(87) PCT Pub. No.: WO2019/190164
PCT Pub. Date: Oct. 3, 2019

(65) Prior Publication Data
US 2021/0014905 A1    Jan. 14, 2021

(30) Foreign Application Priority Data
Mar. 26, 2018  (GB) ..................................... 1804821

(51) Int. Cl.
*H04W 74/0833*   (2024.01)
*H04W 52/02*     (2009.01)
(Continued)

(52) U.S. Cl.
CPC ... *H04W 74/0833* (2013.01); *H04W 52/0216* (2013.01); *H04W 56/0045* (2013.01); *H04W 92/14* (2013.01)

(58) Field of Classification Search
CPC ......... H04W 74/0833; H04W 52/0216; H04W 52/0229; H04W 52/0212; H04W 56/0045
See application file for complete search history.

(56) References Cited

U.S. PATENT DOCUMENTS 6,163,696 A    12/2000  Bi et al.
10,506,483 B1 * 12/2019  Williamson ....... H04B 7/18584
(Continued)

FOREIGN PATENT DOCUMENTS

CN    103052139 A    4/2013
CN    105144801 A    12/2015
(Continued)

OTHER PUBLICATIONS

European Search Report dated Mar. 2, 2021, issued in European Application No. 19777063.9.
(Continued)

*Primary Examiner* — Redentor Pasia
(74) *Attorney, Agent, or Firm* — Jefferson IP Law, LLP

(57) ABSTRACT

Disclosed is a method of managing random access of a User Equipment, UE, in a telecommunication network, comprising the steps of: the UE receiving, from a Base Station, BS, information regarding a response delay interval; the UE transmitting a preamble to a BS; the UE entering a power-saving mode for the duration of the response delay interval, before monitoring for a response from the BS to the preamble.

14 Claims, 11 Drawing Sheets

(51) Int. Cl.
*H04W 56/00* (2009.01)
*H04W 92/14* (2009.01)

(56) References Cited

U.S. PATENT DOCUMENTS

| | | | |
|---|---|---|---|
| 10,547,374 B1* | 1/2020 | Liu | H04W 52/42 |
| 2005/0059411 A1 | 3/2005 | Zhengdi | |
| 2009/0129304 A1* | 5/2009 | Kim | H04W 52/0225 370/311 |
| 2009/0303896 A1* | 12/2009 | Che | H04W 74/006 370/252 |
| 2011/0243048 A1* | 10/2011 | Wang | H04L 1/1874 370/329 |
| 2011/0319066 A1* | 12/2011 | Chou | H04W 88/04 455/422.1 |
| 2013/0039309 A1* | 2/2013 | Chiu | H04W 74/0833 370/328 |
| 2015/0071179 A1* | 3/2015 | Zhang | H04B 7/0619 370/329 |
| 2015/0117410 A1* | 4/2015 | Wu | H04W 36/0069 370/329 |
| 2015/0181571 A1* | 6/2015 | Park | H04W 52/0216 370/252 |
| 2015/0237648 A1* | 8/2015 | Zhang | H04W 72/04 370/329 |
| 2015/0319567 A1* | 11/2015 | Edge | H04W 76/27 455/456.2 |
| 2016/0057702 A1* | 2/2016 | Morioka | H04W 52/0274 370/329 |
| 2016/0081117 A1* | 3/2016 | Morioka | H04W 52/0216 370/336 |
| 2016/0105912 A1* | 4/2016 | Stattin | H04W 74/0833 370/216 |
| 2016/0192433 A1* | 6/2016 | Deenoo | H04W 76/28 370/329 |
| 2016/0219626 A1 | 7/2016 | Martin | |
| 2016/0227575 A1* | 8/2016 | Furuskog | H04W 72/1268 |
| 2016/0360422 A1* | 12/2016 | Zhang | H04W 16/14 |
| 2017/0041830 A1* | 2/2017 | Davis | H04B 7/1851 |
| 2017/0374596 A1* | 12/2017 | Benammar | H04B 7/18541 |
| 2018/0035470 A1 | 2/2018 | Chen et al. | |
| 2018/0110085 A1* | 4/2018 | Tseng | H04L 1/1812 |
| 2018/0146402 A1* | 5/2018 | Seo | H04W 40/12 |
| 2019/0069258 A1* | 2/2019 | Jeon | H04B 7/0695 |
| 2019/0223163 A1* | 7/2019 | Ko | H04W 48/16 |
| 2019/0380112 A1* | 12/2019 | Lee | H04L 1/1887 |
| 2020/0029259 A1* | 1/2020 | Yiu | H04W 76/27 |
| 2020/0120543 A1* | 4/2020 | Turtinen | H04W 28/18 |
| 2020/0187245 A1* | 6/2020 | Fujishiro | H04W 4/70 |
| 2020/0305188 A1* | 9/2020 | Liu | H04W 56/0005 |
| 2021/0120463 A1* | 4/2021 | Kim | H04W 36/0088 |
| 2021/0168683 A1* | 6/2021 | Peisa | H04W 74/0833 |

FOREIGN PATENT DOCUMENTS

| | | |
|---|---|---|
| CN | 105557056 A | 5/2016 |
| CN | 107666722 A | 2/2018 |
| EP | 2 989 837 A1 | 3/2016 |
| GB | 2513314 A | 10/2014 |
| WO | 2006/034747 A1 | 4/2006 |
| WO | 2014/174249 A1 | 10/2014 |
| WO | 2014/179337 A1 | 11/2014 |
| WO | 2015/037191 A1 | 3/2015 |
| WO | 2017/118197 A1 | 7/2017 |

OTHER PUBLICATIONS

Seunghwan Lee et al., LTE Base Station Power Saving Mechanism using Delay Information, Journal of KISS: Information Networking 37(3), Jun. 2010, pp. 243-248, See pp. 243-247.
International Search Report dated Jun. 27, 2019, issued in International Application No. PCT/KR2019/003497.
U.K Search Report dated Mar. 26, 2020, issued in GB patent application No. GB1804821.5.
Chinese Office Action dated Sep. 20, 2023, issued in Chinese Patent Application No. 201980022313.8.
Chinese Notice of Allowance dated Apr. 23, 2024, issued in Chinese Patent Application No. 201980022313.8.

* cited by examiner

RANDOM ACCESS IN A TELECOMMUNICATION NETWORK

TECHNICAL FIELD

The present invention relates to improvements in random access, especially, initial radio access, in a telecommunication network. It applies especially, but not exclusively, to Fifth Generation (5G) or New Radio (NR) systems, although other network types may benefit also.

BACKGROUND ART

In order to meet increasing demands for wireless data traffic after commercialization of 4G communication systems, efforts have been made to develop an improved 5G or pre-5G communication system. The 5G or pre-5G communication system may also be referred to as a beyond 4G network communication system or a post Long-Term Evolution (LTE) system.

In order to achieve high data rates, implementation of a 5G communication system in an ultrahigh frequency (mm-Wave) band (e.g., a 60 GHz band) has been considered. In order to mitigate a path loss of radio waves and to increase transfer distances of the radio waves in the ultrahigh frequency band, technologies such as beamforming, massive multiple-input and multiple-output (MIMO), full dimension MIMO (FD-MIMO), array antennas, analog beamforming, and large scale antennas for the 5G communication system have been discussed.

Further, for network improvements in the 5G communication system, technology developments have been made for an evolved small cell, advanced small cell, cloud radio access network (RAN), ultra-dense network, device to device communication (D2D), wireless backhaul, moving network, cooperative communication, coordinated multi-points (CoMP), and reception interference cancellation. In addition, in the 5G system, hybrid frequency shift keying (FSK) and quadrature amplitude modulation (QAM) (FQAM) and sliding window superposition coding (SWSC), which correspond to advanced coding modulation (ACM) systems, and filter bank multicarrier (FBMC), non-orthogonal multiple access (NOMA), and sparse code multiple access (SCMA), which correspond to advanced connection technologies, have been developed.

Additionally, the Internet, which is a human centered connectivity network where humans generate and consume information, is now evolving to into the Internet of things (IoT), where distributed entities, i.e., things, exchange and process information. The Internet of everything (IoE), which is a combination of the IoT technology and big data processing technology through connection with a cloud server, has also emerged. As technology elements, such as sensing technology, wired/wireless communication, and network infrastructure, service interface technology, and security technology, have been demanded for IoT implementation, a sensor network for machine-to-machine connection, machine-to-machine (M2M) communication, machine type communication (MTC), etc., have been recently researched. An IoT environment may provide intelligent Internet technology services that create a new value to human life by collecting and analyzing data generated among connected things. The IoT may be applied to a variety of fields including a smart home, a smart building, a smart city, a smart car or connected cars, a smart grid, health care, smart appliances, and advanced medical services through convergence and combination between the existing information technology (IT) and various industries.

Accordingly, various attempts have been made to apply the 5G communication system to IoT networks. For example, technologies of a sensor network, M2M communication, and MTC have been implemented by techniques for beam-forming, MIMO, and array antennas, which correspond to the 5G communication technology. As the big data processing technology as described above, application of a cloud radio access network (RAN) would be an example of convergence between the 5G technology and the IoT technology.

The 5G system is expected to support increased various services as compared with the existing 4G system. For example, most representative services may be enhanced mobile broad band (eMBB), ultra-reliable and low latency communication (URLLC), massive machine type communication (mMTC), evolved multimedia broadcast/multicast service (eMBMS), etc. A system providing the URLLC service may be referred to as "a URLLC system," and a system providing the eMBB service may be referred to as "an eMBB system."

DISCLOSURE OF INVENTION

Technical Problem

Embodiments of the invention aim to address issues associated with such delays. In particular, embodiments of the invention seek to reduce unnecessarily large UE monitoring intervals and to save UE power when a BS has large response delays.

Solution to Problem

According to the present invention there is provided an apparatus and method as set forth in the appended claims. Other features of the invention will be apparent from the dependent claims, and the description which follows.

In embodiments of the invention, delay information is taken into account and the BS will convey this information via system information block (SIB) to the UE after the UE completes the synchronization procedure. This allows the UE to adapt its operation to the extended delay period, allowing it to remain in a lower power state for longer and thus save power.

Although a few preferred embodiments of the present invention have been shown and described, it will be appreciated by those skilled in the art that various changes and modifications might be made without departing from the scope of the invention, as defined in the appended claims.

Advantageous Effects of Invention

Embodiments of the invention provide address issues associated with such delays. In particular, embodiments of the invention seek to reduce unnecessarily large UE monitoring intervals and to save UE power when a BS has large response delays.

BRIEF DESCRIPTION OF DRAWINGS

For a better understanding of the invention, and to show how embodiments of the same may be carried into effect, reference will now be made, by way of example only, to the accompanying diagrammatic drawings in which.

MODE FOR THE INVENTION

Figure 1:
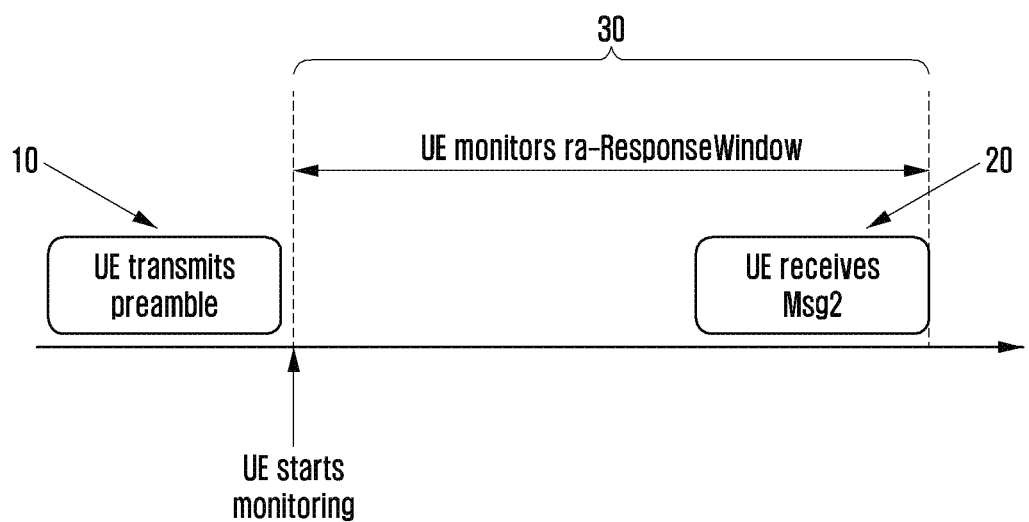
FIG. 1 shows a representation of the UE performing a radio access procedure.

Hereinafter, various embodiments of the present disclosure will be described in detail with reference to the accompanying drawings. In the accompanying drawings, the same drawing reference numerals may be used for the same elements across various figures. Further, well-known functions or configurations incorporated herein will be omitted to avoid obscuring the subject matter of the present disclosure in unnecessary detail.

Although the terms used herein are defined in consideration of functions in the embodiments, the terms may be changed according to the intention of a user or an operator, or customs. Therefore, the present disclosure should be understood, not simply by the terms used, but based on the contents of the whole description of the present disclosure.

In the embodiments of the present disclosure described below, although constituent elements included in the present disclosure may expressed in a singular form or in a plural form, such a singular or plural expression is selected to suit a situation presented for convenience in explanation, and thus the present disclosure is not limited to such singular or plural constituent elements. Even plural constituent elements may be expressed in a singular form, and even a single constituent element may be expressed in a plural form.

Although communications standards organized by the 3GPP are referenced in describing embodiments of the present disclosure, the present disclosure may also be applied to other communication systems having similar technical backgrounds or channel types, through slight modifications thereof.

Herein, the terms slices, services, network slices, network services, application slices, and application services may be interchangeably used.

Additionally, the terms "service" and "system" may be interchangeably used herein.

In the prior-art, User Equipment, UEs, start monitoring random access responses (RARs) shortly after sending preambles to a base station (BS) of the network. However, this is not suitable for a BS with a large response delay. These large response delays can include large propagation delays in non-terrestrial networks (NTNs, of the type which use e.g. satellite links) and/or multi-hop forwarding delays in integrated access backhaul (IAB) networks. There are other network configurations and entities which can also introduce longer than usual delays and embodiments of the present invention can also address issues with these.

FIG. 1 shows a representation of a random access (RA) in the prior art. The UE transmits a preamble 10 and shortly thereafter begins monitoring for a response from the BS, in the form of Msg2 20. From the time that the UE begins monitoring, a time interval—ra-ResponseWindow— runs, during which time the UE actively monitors and expects to receive Msg2.

Figure 2A:
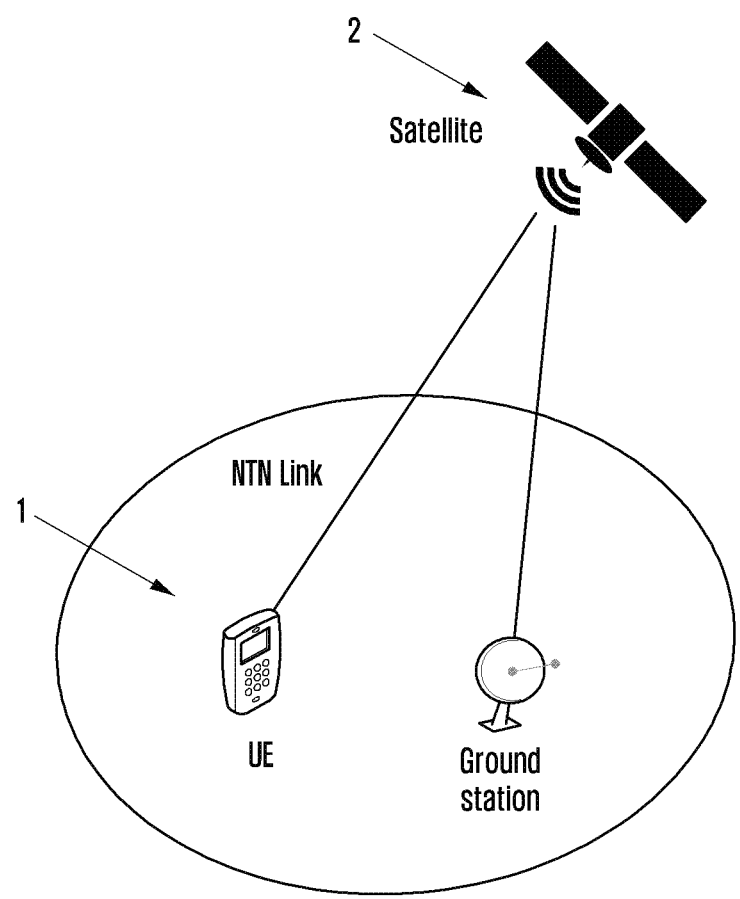
FIGS. 2a and 2b show representations of two types of NTN.
Figure 2B:
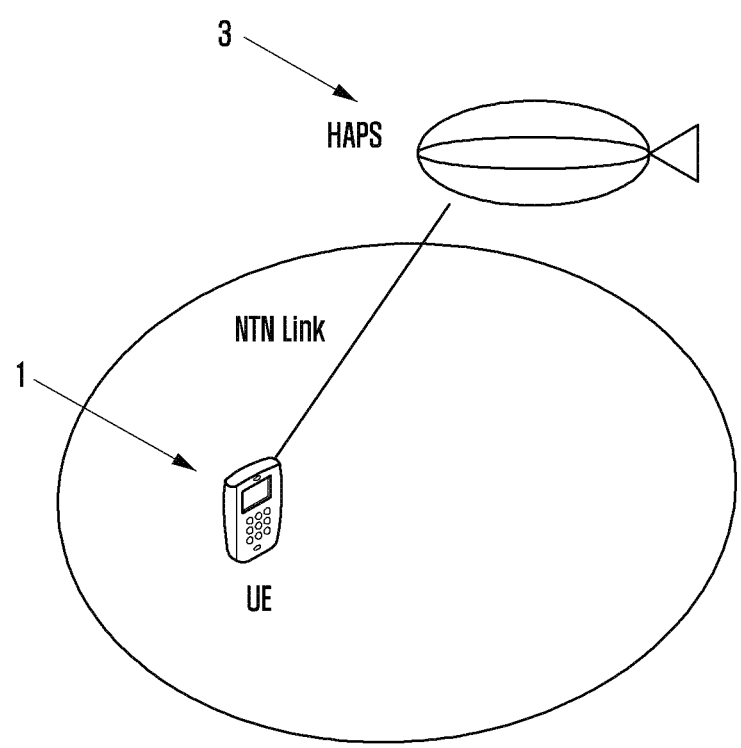

In the case of NTNs, the BS can be a satellite or a high-altitude platform station (HAPS, such as a balloon or airship), both of which have a much higher altitude than terrestrial BSs. This, of course, increases the propagation delay between the UE and the BS. This is illustrated in FIGS. 2a and 2b, which show two scenarios with a UE 1, in communication with either a satellite 2 or a HAPS 3.

In either case, NTNs introduce large propagation delays in uplink and downlink. Following prior art procedures, the BS needs to configure a large RA response window in which the UE listens out for Msg2. However, this large response window creates unnecessary UE power consumption.

Figure 3:
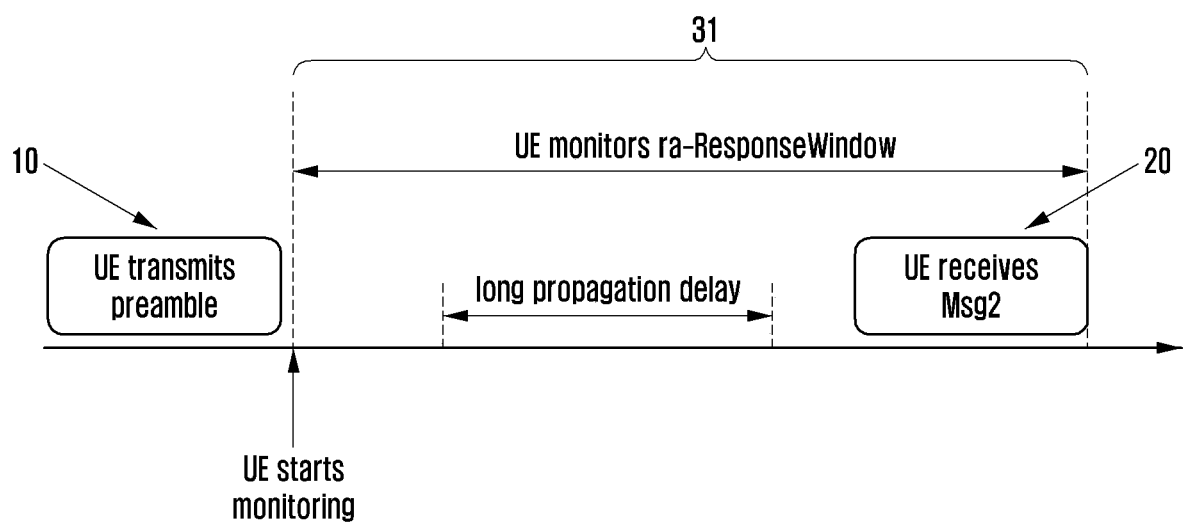
FIG. 3 shows a representation of an extended monitoring interval during RA.

This is illustrated in FIG. 3, which is similar to FIG. 1, but includes a much larger response window 31.

Figure 4:
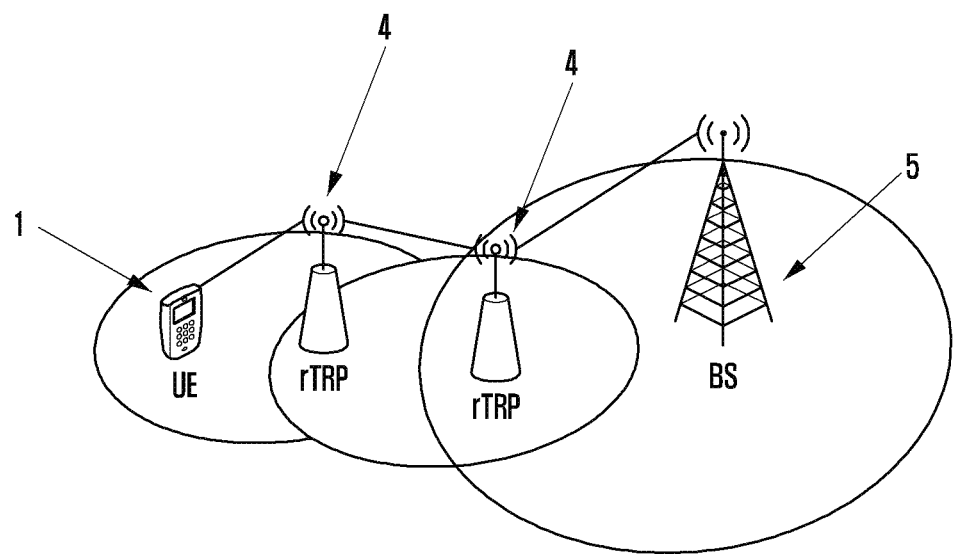
FIG. 4 shows a representation of multihop transmissions in an IAB network.

A similar problem exists in systems employing integrated access backhaul (IAB) networks where the BS may transmit information to the UE via multi-hops, i.e., relay transception points. These may also be known as Relay Nodes (RNs). Large forwarding delays can occur in these rTRPs. This is illustrated in FIG. 4, which shows a UE 1, communicating with a BS 5, via two rTRPs 4. These multiple hops can introduce delays. This results in a large delay, as illustrated in FIG. 3, previously.

Embodiments of the invention aim to address issues associated with such delays. In particular, embodiments of the invention seek to reduce unnecessarily large UE monitoring intervals and to save UE power when a BS has large response delays.

Embodiments of the invention aim to minimise unnecessary UE monitoring intervals and UE power consumption in the initial access phase in NR networks. The overall procedure involves a BS estimating the response delay and broadcasting this information via SIB in the physical broadcast channel (PBCH) to the UE. Then, in the cell search phase, the UE can decode the SIB and obtain this information and so modify its behavior accordingly.

After the UE transmits preambles on the physical random access channel (PRACH), the UE does not start monitoring random access responses (RARs) until the time interval exceeds the response delay, which has been declared by the BS.

Figure 5:
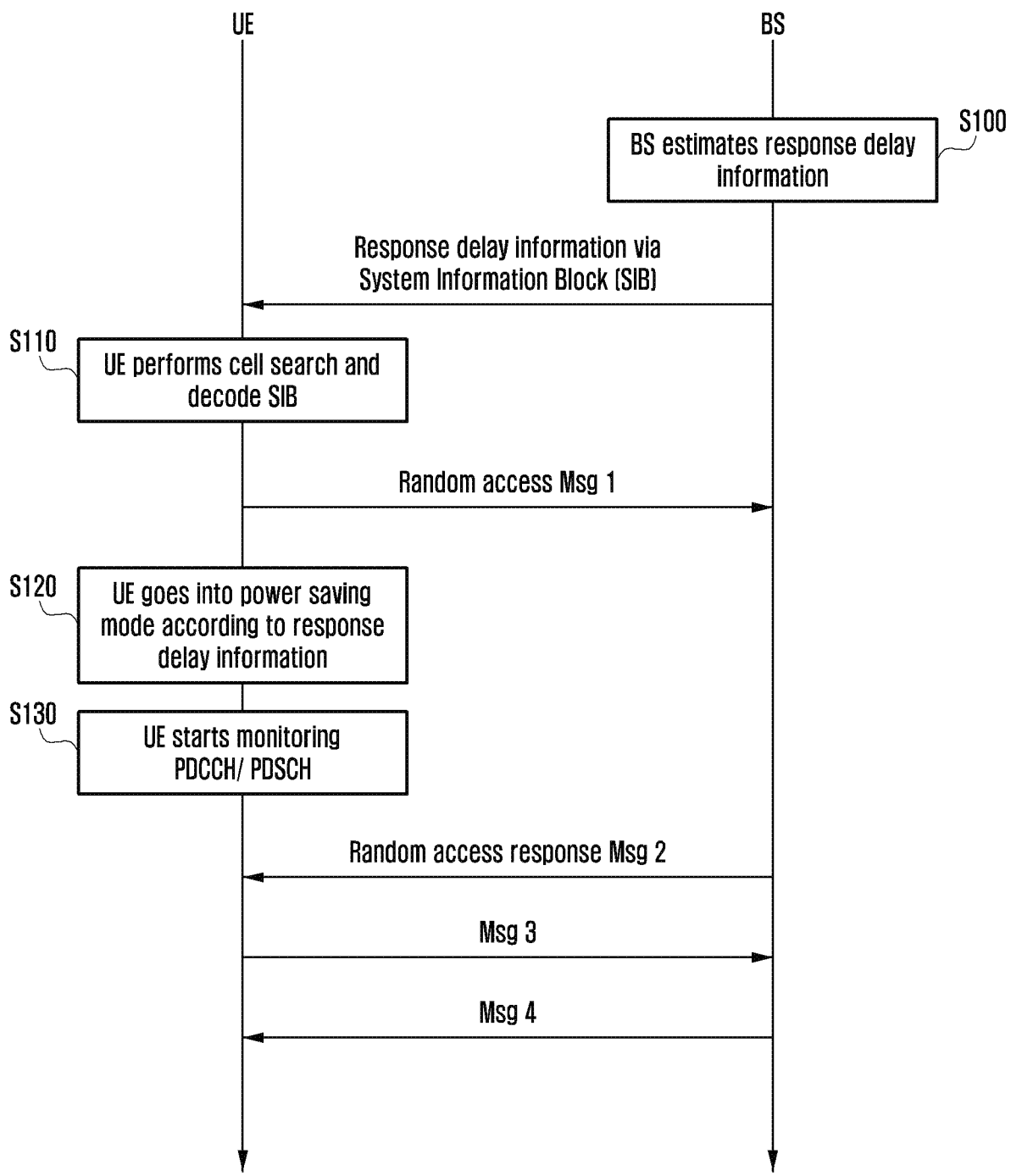
FIG. 5 a representation of an RA procedure in a network with a long response delay.

As shown in FIG. 5, in the initialization of the NR network, the BS first estimates its response delay (S100). Then, this response delay information is broadcast to UEs in the network via a system information block (SIB). After a UE completes its synchronization procedure, the UE will decode the SIB and acquire the response delay information (S110).

Next, the UE transmits a preamble (Msg1) to the BS and goes into power saving mode until the response delay expires (S120). Then, the UE starts monitoring PDCCH/PDSCH for its random access response (RAR) (S130). The rest of the procedure follows the same or similar steps to prior art systems and involves the exchange of the known messages Msg2, Msg3 and Msg4.

Figure 6:
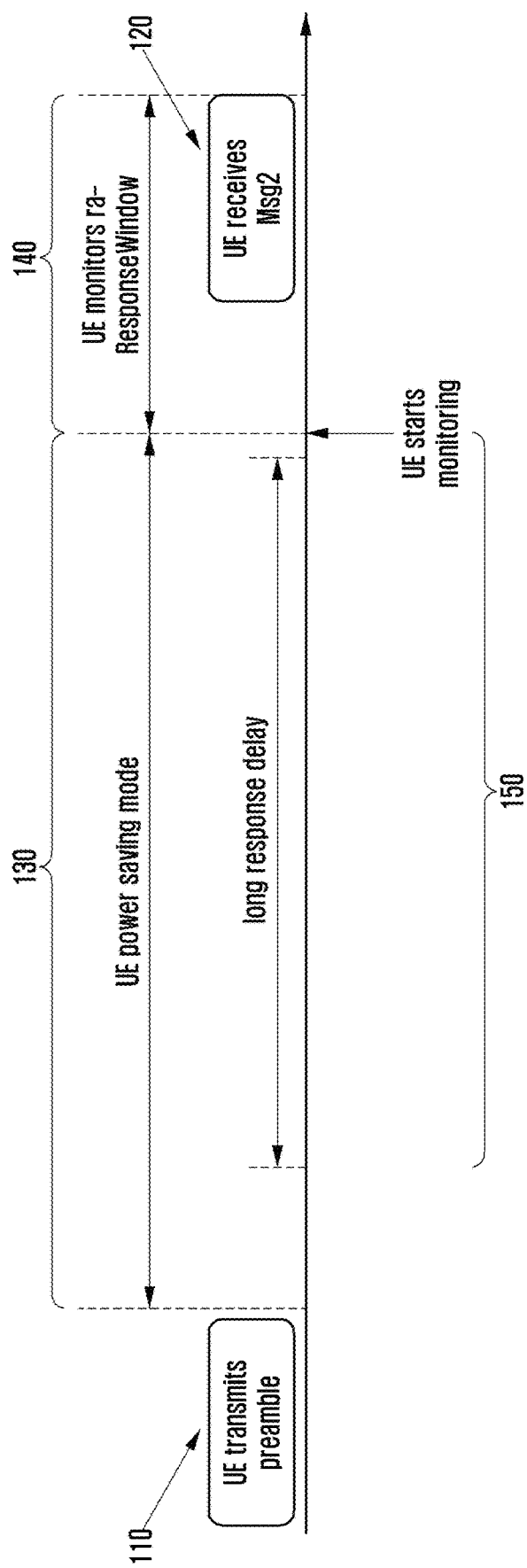
FIG. 6 shows a representation of various events in the time domain during RA.

FIG. 6 illustrates the process of FIG. 5 in the time domain. Here, the UE transmits the preamble 110 and then enters a power saving mode for a period of time 130. The period of the power saving mode 130 is indicated to the UE by the BS, once it has calculated it, as set out previously. It is based on the delay period 150, again determined by the BS.

Once the power saving mode is over, the UE is operable to listen out for Msg2 during time period 140. Upon receipt of Msg2, operation continues as per the prior art and as shown in FIG. 5.

In an embodiment, a system information block (SIB) includes response delay information. This can be implemented as multiples of one millisecond. When a UE acquires this information from the BS, it can go into power saving mode before this interval expires. The following shows an example of a SIB supporting up to 1024 milliseconds.
SystemInformationBlockType Information Element ---
-- ASN1START
SystemInformationBlockType ::=  SEQUENCE {
   response-delay                           INTEGER (2,3,...,1024),
   ...
}
-- ASN1STOP

---

The following is a definition of the field response-delay in the above data structure.

---
SystemInformationBlockType field descriptions
---
response-delay
Response delay as multiples of one millisecond. The UE can go into power saving mode within this period after it finishes its preamble transmission.

---

Figure 7A:
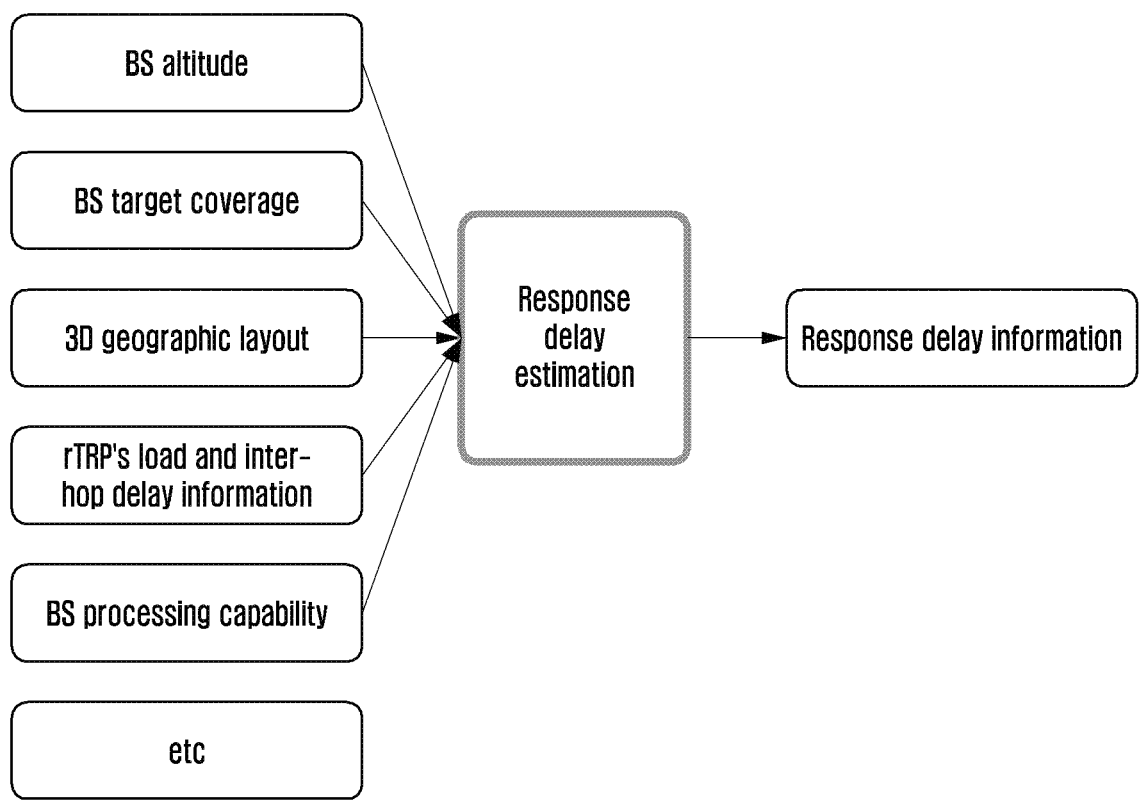
FIG. 7a shows a representation of a delay estimator according to an embodiment of the invention.

FIG. 7a shows a representation of a response delay estimation process, used to determine response delay at the BS. This takes various inputs, processes them and outputs response delay information, which may then be passed to the UE, as described previously.

In FIG. 7a, the response delay estimation process takes in one or more inputs, which can include: BS altitude; BS target coverage; 3-d geographic layout; rTRP's load and inter-hop delay information; and BS processing capability. Not all of these variables will apply in each case and there may be others which will affect response delay which will be known to the skilled person in a any given scenario.

Figure 7B:
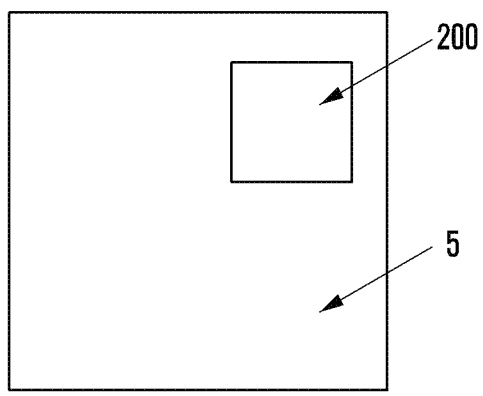
FIG. 7b shows a BS including a delay estimator according to an embodiment of the invention.

FIG. 7b shows a BS 5 incorporating a response delay estimator 200 according to an embodiment of the invention. The delay estimator is a module in the BS 5 which implements the methodology set out herein to estimate the response delay based on one or more of the factors described.

A BS may estimate response delay based on its altitude, target cell size, three-dimension layouts of the geographical area, etc: Altitude of the NTN BS is pre-configured or set by the operator before the network is formed and so known to the BS. Also, the target cell size is set, depending on the transmission power and antenna pattern used in the NTN BS. As a result, the NTN BS may estimate response delay based on this information.

Figure 8:
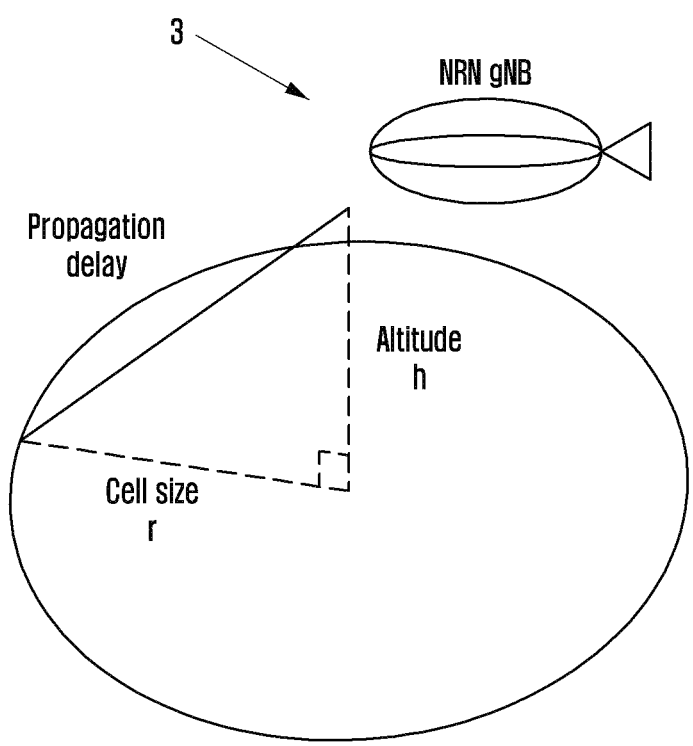
FIG. 8 shows a representation of delay estimation in an NTN network.

An example is shown in FIG. 8. Give the altitude h and the target cell size (radius) r, the NTN BS can have a first estimate of response delay via $$\tau = \frac{1}{c}\sqrt{h^2 + r^2}.$$

For certain safety margin and delay spread, the broadcast response delay T can be computed by e.g. $0.8\tau$ or $2.0\tau$, which define a range, selected on the basis of experiment or experience. The range specified here i.e $0.8\tau$ to $2.0\tau$ is exemplary only and intended to define a suitable range which will operate in most circumstances. The skilled person will realise that the range can be adjusted to suit different needs.

Additionally, if the operator of the NTN BS has prior information of the 3D geographical layout of the area, this information can be fed into the propagation delay estimator by considering heights of buildings as well.

Figure 9:
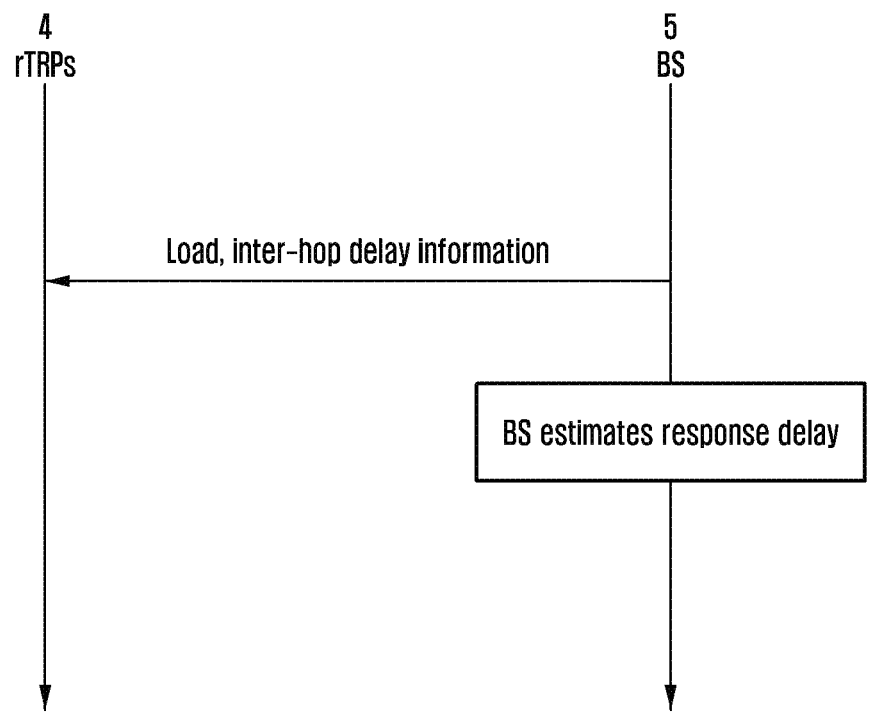
FIG. 9 shows a representation of response delay estimation in an IAB network.

A BS may estimate response delay based on the load and inter-hop delay information provided by rTRPs, etc: In an IAB network shown in FIG. 4, there are a number of rTRPs 4 to relay messages between a UE 1 and a BS 5. To estimate the forwarding delay, these rTRPs 4 will report their load information and inter-hop delay information to the BS 5 as illustrated in FIG. 9. Let the load of rTRPs be $\{L_1, L_2, \ldots, L_N\}$ bits and the processing capabilities of rTRPs be P bps and let the inter-hop delay be $\{T_{1\to 2}, T_{2\to 3}, \ldots, T_{N\to BS}\}$. The estimated forwarding delay can be computed as $$\tau = \sum_{n}^{N} L_n / P + \sum_{i=1}^{N-1} \sum_{j=i+1}^{N} T_{i \to j} + T_{N \to BS}.$$

Further, a BS may estimate response delay based on its load and its processing capability, for instance. Let the load of the BS be $L_{BS}$ bits and the processing capabilities of the BS be $P_{BS}$ bps, the BS processing delay can be estimated as $L_{BS}/P_{BS}$.

Embodiments of the invention are able to reduce unnecessary monitoring by the UE and so reduce overall power consumption. This is achieved by means of information provided by the BS to the UE, enabling the UE to adapt its operation so that it is not actively monitoring transmissions from the BS during the response delay interval, details of which have been sent to it from the BS. Additionally, the BS is operable to consider one or more parameters in order to calculate the response delay before passing said information to the UE.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by a terminal in a non-terrestrial network (NTN), the method comprising:
   receiving, from a base station of the NTN, system information including a response delay value to accommodate a propagation delay between the terminal and the base station in the NTN, wherein the base station is a satellite;
   transmitting, to the base station, a random access preamble;
   entering a power saving mode for a period of time determined based on the response delay value, wherein the terminal is inoperable to monitor a physical downlink control channel (PDCCH) in the power saving mode; and
   monitoring the PDCCH for a random access response associated with the random access preamble after the power saving mode is over,
   wherein the response delay value is determined based on a load of the base station and a processing capability of the base station.

2. The method of claim 1, wherein the response delay value is associated with a position of the satellite of the base station.

3. The method of claim 1, further comprising:
   receiving, from the base station, the random access response after the power saving mode is over.

4. The method of claim 1, wherein an altitude of the satellite supported in the NTN is predetermined.

5. A method performed by a base station in a non-terrestrial network (NTN), the method comprising:
   transmitting, to a terminal, system information including a response delay value to accommodate a propagation delay between the terminal and the base station in the NTN;
   receiving, from the terminal, a random access preamble; and
   transmitting, to the terminal, a random access response associated with the random access preamble,
   wherein the base station is a satellite,
   wherein a physical downlink control channel (PDCCH) for the random access response is not monitored during a power saving mode of the terminal,
   wherein a period of time for the power saving mode is determined based on the response delay value, and
   wherein the response delay value is determined based on a load of the base station and a processing capability of the base station.

6. The method of claim 5, wherein the response delay value is associated with a position of the satellite of the base station.

7. The method of claim 5, wherein an altitude of the satellite supported in the NTN is predetermined.

8. A terminal in a non-terrestrial network (NTN), the terminal comprising:
   a transceiver; and
   a controller configured to:
      receive, from a base station of the NTN via the transceiver, system information including a response delay value to accommodate a propagation delay between the terminal and the base station in the NTN, wherein the base station is a satellite,
      transmit, to the base station via the transceiver, a random access preamble,
      enter a power saving mode for a period of time determined based on the response delay value, wherein the terminal is inoperable to monitor a physical downlink control channel (PDCCH) in the power saving mode, and
      monitor the PDCCH for a random access response associated with the random access preamble after the power saving mode is over,
   wherein the response delay value is determined based on a load of the base station and a processing capability of the base station.

9. The terminal of claim 8, wherein the response delay value is associated with a position of the satellite of the base station.

10. The terminal of claim 8, wherein the controller is further configured to:
    receive, from the base station via the transceiver, the random access response after the power saving mode is over.

11. The terminal of claim 8, wherein an altitude of the satellite supported in the NTN is predetermined.

12. A base station in a non-terrestrial network (NTN), the base station comprising:
    a transceiver; and
    a controller configured to:
       transmit, to a terminal via the transceiver, system information including a response delay value to accommodate a propagation delay between the terminal and the base station in the NTN,
       receive, from the terminal via the transceiver, a random access preamble, and
       transmit, to the terminal via the transceiver, a random access response associated with the random access preamble, wherein the base station is a satellite,
wherein a physical downlink control channel (PDCCH) for the random access response is not monitored during a power saving mode of the terminal,
wherein a period of time for the power saving mode is determined based on the response delay value, and
wherein the response delay value is determined based on a load of the base station and a processing capability of the base station.

13. The base station of claim 12, wherein the response delay value is associated with a position of the satellite of the base station.

14. The base station of claim 12, wherein an altitude of the satellite supported in the NTN is predetermined.

* * * * *